United States Patent
Ishioka et al.

(10) Patent No.: US 11,292,460 B2
(45) Date of Patent: Apr. 5, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Atsushi Ishioka, Wako (JP); Masanori Takeda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 333 days.

(21) Appl. No.: 16/477,922

(22) PCT Filed: Jan. 19, 2017

(86) PCT No.: PCT/JP2017/001707
§ 371 (c)(1),
(2) Date: Jul. 15, 2019

(87) PCT Pub. No.: WO2018/134941
PCT Pub. Date: Jul. 26, 2018

(65) Prior Publication Data
US 2019/0367018 A1    Dec. 5, 2019

(51) Int. Cl.
*B60W 30/095* (2012.01)
*B60W 10/04* (2006.01)
*B60W 10/20* (2006.01)

(52) U.S. Cl.
CPC .......... *B60W 30/095* (2013.01); *B60W 10/04* (2013.01); *B60W 10/20* (2013.01);
(Continued)

(58) Field of Classification Search
CPC .. B60W 10/04; B60W 10/20; B60W 2400/00; B60W 2420/42; B60W 2420/52;
(Continued)

(56) References Cited

U.S. PATENT DOCUMENTS

| 9,381,915 B1* | 7/2016 | Crombez .............. B60W 50/12 |
| 2005/0090983 A1 | 4/2005 | Isaji et al. |

(Continued)

FOREIGN PATENT DOCUMENTS

| CN | 104157160 | 11/2014 |
| CN | 105835819 | 8/2016 |

(Continued)

OTHER PUBLICATIONS

International Search Report and Written Opinion for International Application No. PCT/JP2017/001707 dated Apr. 18, 2017, 10 pgs.

(Continued)

*Primary Examiner* — Babar Sarwar
(74) *Attorney, Agent, or Firm* — Amin, Turocy & Watson, LLP (57) ABSTRACT

A vehicle control system including: a recognizer that recognizes a target in the vicinity of a subject vehicle; a first processor that repeatedly performs a process of determining a first target speed, which is a target speed of the subject vehicle in the future, at a first period on the basis of the target recognized by the recognizer and a state of the subject vehicle; a second processor that repeatedly performs a process of determining a second target speed, which is a target speed of the subject vehicle in the future, at a second period shorter than the first period on the basis of the first target speed determined by the first processor, the target recognized by the recognizer, and the state of the subject vehicle; and a running controller that controls acceleration/deceleration of the subject vehicle on the basis of at least one of the first target speed determined by the first processor and the second target speed determined by the second processor.

7 Claims, 9 Drawing Sheets

(52) U.S. Cl.
CPC ... *B60W 2400/00* (2013.01); *B60W 2554/801* (2020.02); *B60W 2554/804* (2020.02); *B60W 2710/20* (2013.01); *B60W 2720/106* (2013.01)

(58) Field of Classification Search
CPC ....... B60W 2540/215; B60W 2554/00; B60W 2554/40; B60W 2554/801; B60W 2554/804; B60W 2556/50; B60W 2710/20; B60W 2720/106; B60W 30/095; B60W 30/143; B60W 30/16; B60W 50/0097

See application file for complete search history.

(56) References Cited

U.S. PATENT DOCUMENTS

| | | | |
|---|---|---|---|
| 2008/0065328 A1* | 3/2008 | Eidehall | G01S 7/295 701/301 |
| 2009/0234553 A1* | 9/2009 | Sekiguchi | B60W 30/16 701/96 |
| 2011/0190972 A1* | 8/2011 | Timmons | G08G 1/166 701/31.4 |
| 2015/0183430 A1* | 7/2015 | Schwindt | B60W 30/09 701/23 |
| 2016/0107643 A1* | 4/2016 | Mizutani | G01S 13/931 701/519 |
| 2016/0159360 A1* | 6/2016 | Miller | B60W 40/10 701/22 |
| 2017/0039855 A1* | 2/2017 | Maeda | B60W 30/09 |
| 2017/0120909 A1* | 5/2017 | On | B60W 30/12 |
| 2018/0162394 A1* | 6/2018 | Kamiya | G06K 9/00805 |
| 2018/0222423 A1* | 8/2018 | Takae | B60R 21/00 |
| 2019/0005821 A1* | 1/2019 | Matsunaga | G08G 1/165 |
| 2019/0100209 A1* | 4/2019 | Plianos | B60W 30/18127 |
| 2019/0227546 A1* | 7/2019 | Sato | B60W 50/14 |
| 2019/0263367 A1* | 8/2019 | You | B60W 50/14 |
| 2020/0139960 A1* | 5/2020 | Newman | B60W 30/095 |
| 2021/0009113 A1* | 1/2021 | Kim | B60W 10/18 |

FOREIGN PATENT DOCUMENTS

| | | |
|---|---|---|
| JP | 2001-199260 | 7/2001 |
| JP | 2006-199233 | 8/2006 |
| JP | 2010-100123 | 5/2010 |
| JP | 2010-205228 | 9/2010 |
| JP | 2013-173404 | 9/2013 |
| JP | 2016-081202 | 5/2016 |

OTHER PUBLICATIONS

Chinese Office Action for Chinese Patent Application No. 201780083186.3 dated Nov. 11, 2021.

* cited by examiner

| | DETECTION PERIOD[ms] |
|---|---|
| CAMERA | 100 |
| RADAR | 10 |
| FINDER | 50 |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

Conventionally, a technology for controlling at least one of an operation and acceleration/deceleration of a vehicle to avoid an obstacle in a case in which the obstacle is present on a side in front in an advancement direction of the vehicle is known (for example, Patent Document 1).

PRIOR ART DOCUMENTS

Patent Documents

[Patent Document 1]
Japanese Unexamined Patent Application, First Publication No. 2010-100123

SUMMARY OF INVENTION

Problems to be Solved by the Invention

However, in a conventional technology, there are cases in which the time taken until an avoiding action is taken after recognition of an obstacle becomes long.

The present invention is realized in consideration of such situations, and one objective thereof is to provide a vehicle control system, a vehicle control method, and a vehicle control program capable of more quickly taking an avoiding action for a target.

Solution to Problem

According to a first aspect of the present invention, there is provided a vehicle control system including: a recognizer that recognizes a target in the vicinity of a subject vehicle; a first processor that repeatedly performs a process of determining a first target speed, which is a target speed of the subject vehicle in the future, at a first period on the basis of the target recognized by the recognizer and a state of the subject vehicle; a second processor that repeatedly performs a process of determining a second target speed, which is a target speed of the subject vehicle in the future, at a second period shorter than the first period on the basis of the first target speed determined by the first processor, the target recognized by the recognizer, and the state of the subject vehicle; and a running controller that controls acceleration/deceleration of the subject vehicle on the basis of at least one of the first target speed determined by the first processor and the second target speed determined by the second processor.

According to a second aspect of the present invention, in the vehicle control system described in the first aspect, the first processor further determines a target position of the subject vehicle in the future on the basis of the target recognized by the recognizer and the state of the subject vehicle, and the running controller controls steering of the subject vehicle on the basis of the target position determined by the first processor.

According to a third aspect of the present invention, in the vehicle control system described in the second aspect, the second processor determines whether or not the subject vehicle and the target interfere with each other in the process of reaching the target position and sets the second target speed to a speed lower than the first target speed in a case in which it is determined that the subject vehicle and the target interfere with each other.

According to a fourth aspect of the present invention, in the vehicle control system described in the third aspect, the second processor determines the second target speed on the basis of a relative distance or a relative speed between the subject vehicle and the target.

According to a fifth aspect of the present invention, in the vehicle control system described in any one of the first aspect to fourth aspect, a plurality of sensors disposed in the vicinity of the subject vehicle is further included, wherein the recognizer recognizes the target using detection results acquired by the plurality of sensors, and the second processor determines the second target speed on the basis of the target recognized by the recognizer using a detection result acquired by a sensor disposed on the front of the subject vehicle among the plurality of sensors and the first target speed.

According to a sixth aspect of the present invention, in the vehicle control system described in the fifth aspect, the plurality of sensors have mutually-different detection periods, and the second processor determines the second target speed on the basis of the target recognized by the recognizer using a detection result acquired by a sensor having a shorter detection period than that of any other sensor among the plurality of sensors.

According to a seventh aspect of the present invention, in the vehicle control system described in any one of the first aspect to fourth aspect, there is provided a vehicle control method using an in-vehicle computer, the vehicle control method including: recognizing a target in the vicinity of a subject vehicle; repeatedly performing a process of determining a first target speed, which is a target speed of the subject vehicle in the future, at a first period on the basis of the recognized target and a state of the subject vehicle; repeatedly performing a process of determining a second target speed, which is a target speed of the subject vehicle in the future, at a second period shorter than the first period on the basis of the determined first target speed, the recognized target, and the state of the subject vehicle; and controlling acceleration/deceleration of the subject vehicle on the basis of at least one of the determined first target speed and the determined second target speed.

According to an eighth aspect of the present invention, there is provided a vehicle control program causing an in-vehicle computer to execute: recognizing a target in the vicinity of a subject vehicle; repeatedly performing a process of determining a first target speed, which is a target speed of the subject vehicle in the future, at a first period on the basis of the recognized target and a state of the subject vehicle; repeatedly performing a process of determining a second target speed, which is a target speed of the subject vehicle in the future, at a second period shorter than the first period on the basis of the determined first target speed, the recognized target, and the state of the subject vehicle; and controlling acceleration/deceleration of the subject vehicle on the basis of at least one of the determined first target speed and the determined second target speed.

Advantageous Effects of Invention

According to the above described aspects of the present invention a process of determining a first target speed, which is a target speed of a subject vehicle in the future, is performed at a first period on the basis of a target disposed in the vicinity of the subject vehicle and a state of the subject vehicle, a process of determining a second target speed, which is a target speed of the subject vehicle in the future, is performed at a second period shorter than the first period on the basis of the determined first target speed, the target in the vicinity of the subject vehicle and the state of the subject vehicle, and acceleration/deceleration of the subject vehicle is controlled on the basis of at least one of the first target speed and the second target speed, whereby an avoiding action can be performed more quickly for the target.

BRIEF DESCRIPTION OF THE DRAWINGS

FIG. 6 is a flowchart illustrating a series of processes performed by the first trajectory generator 123a.

EMBODIMENTS FOR CARRYING OUT THE INVENTION

Hereinafter, a vehicle control system, a vehicle control method, and a vehicle control program according to embodiments of the present invention will be described with reference to the drawings.

[Vehicle Configuration]

Figure 1:
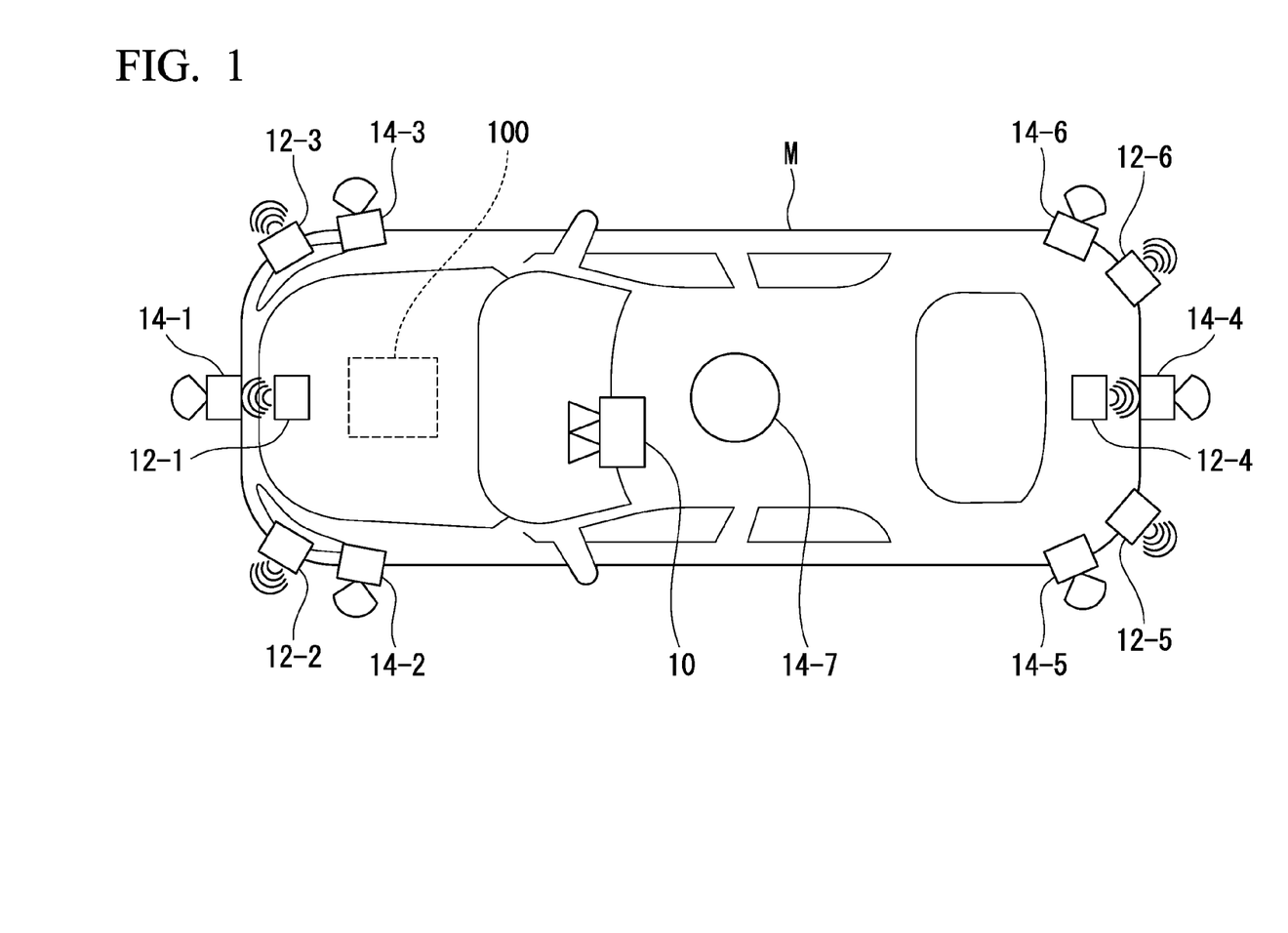
FIG. 1 is a diagram showing constituent elements included in a vehicle in which a vehicle control system 1 according to an embodiment is mounted.

FIG. 1 is a diagram showing constituent elements included in a vehicle (hereinafter, referred to as a subject vehicle M) in which a vehicle control system 1 according to an embodiment is mounted. The subject vehicle M in which the vehicle control system 1 is mounted (hereinafter, referred to as a "subject vehicle M") is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

As illustrated in FIG. 1, for example, sensors such as a camera 10, radars 12-1 to 12-6, and finders 14-1 to 14-7 and an automated driving controller 100 to be described later are mounted in the subject vehicle M. Hereinafter, in a case in which the radars 12-1 to 12-6 do not need to be particularly distinguished from each other, one thereof will be simply referred to as a "radar 12," and, in a case in which the finders 14-1 to 14-7 do not need to be particularly distinguished from each other, one thereof will be simply referred to as a "finder 14."

The camera 10, for example, is a digital camera using a solid-state imaging device such as a charge coupled device (CCD) or a complementary metal oxide semiconductor (CMOS). One or a plurality of cameras 10 are installed at arbitrary places in the subject vehicle M. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar 12 emits radiowaves such as millimeter waves to the vicinity of the subject vehicle M and detects at least a position of (a distance to and an azimuth of) an object by detecting radiowaves (reflected waves) reflected by the object. One or a plurality of radars 12 are installed at arbitrary places in the subject vehicle M. The radar 12 may detect a position and a speed of an object using a frequency modulated continuous wave (FMCW) system.

The finder 14 is a light detection and ranging or a laser imaging detection and ranging (LIDAR) finder that detects a distance to a target by measuring light scattered from emitted light. One or a plurality of finders 14 are installed at arbitrary places in the subject vehicle M.

In addition, the configuration illustrated in FIG. 1 is merely one example, and part of the configuration may be omitted, and further another configuration may be added.

[Configuration of Vehicle Control System]

Figure 2:
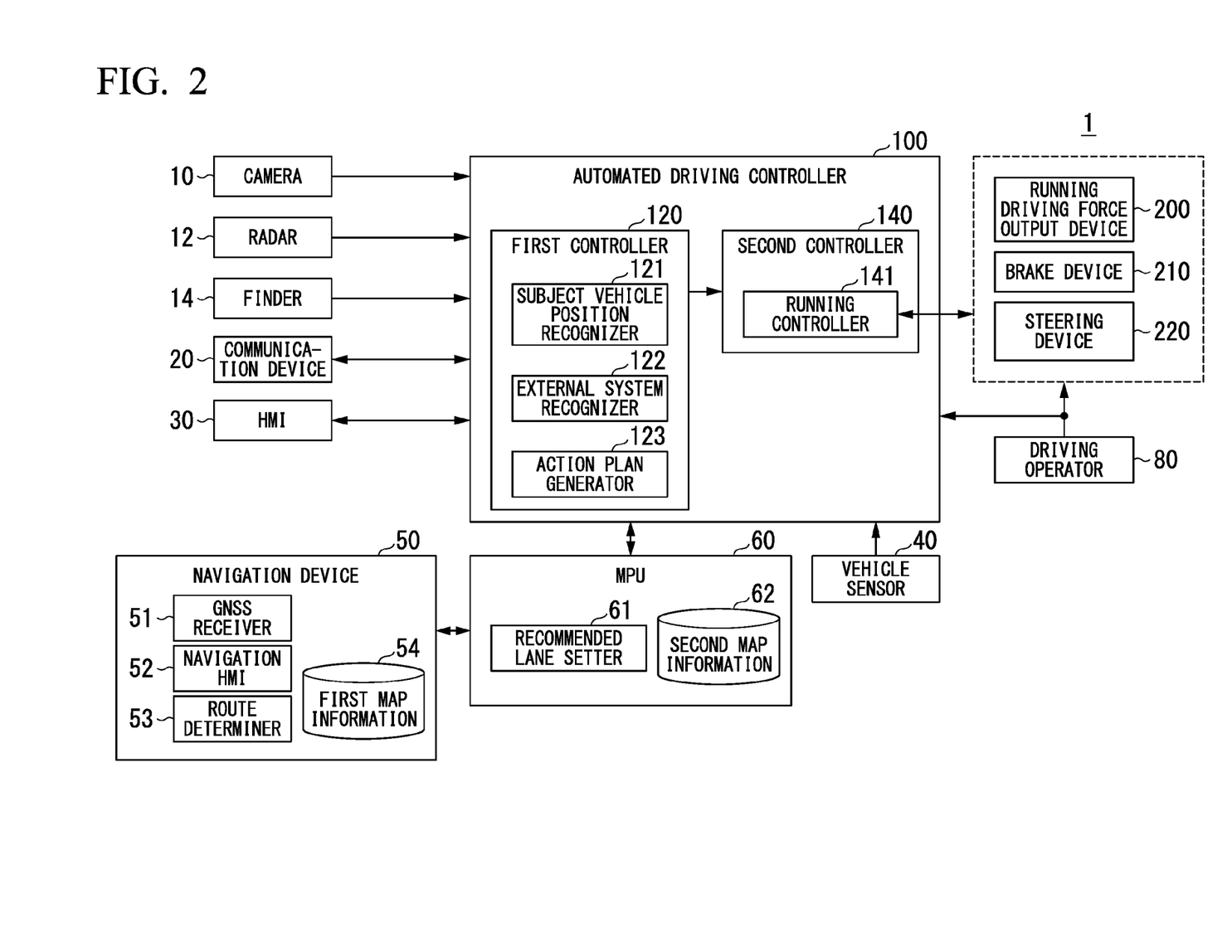
FIG. 2 is a configuration diagram of a vehicle control system 1 according to an embodiment.

FIG. 2 is a configuration diagram of a vehicle control system 1 according to an embodiment. The vehicle control system 1, for example, includes a camera 10, a radar 12, a finder 14, a communication device 20, a human machine interface (HMI) 30, a vehicle sensor 40, a navigation device 50, a micro-processing unit (MPU) 60, a driving operator 80, an automated driving controller 100, a running driving force output device 200, a brake device 210, and a steering device 220. Such devices and units are interconnected using a multiplex communication line such as a controller area network (CAN) communication line, a serial communication line, a radio communication network, or the like.

The communication device 20, for example, communicates with other vehicles (one example of nearby vehicles) present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the subject vehicle M and accepts an input operation performed by a vehicle occupant. The HMI 30, for example, includes various displays, a speaker, a buzzer, a touch panel, a switch, a key, and the like.

The vehicle sensor 40 includes a vehicle speed sensor detecting a speed of the subject vehicle M, an acceleration sensor detecting an acceleration, a yaw rate sensor detecting an angular velocity around a vertical axis, an azimuth sensor detecting the azimuth of the subject vehicle M, and the like. The vehicle sensor 40 outputs detected information (a speed, an acceleration, an angular velocity, an azimuth, and the like) to the automated driving controller 100.

The navigation device 50, for example, includes a global navigation satellite system (GNSS) receiver 51, a navigation HMI 52, and a route determiner 53 and stores first map information 54 in a storage device such as a hard disk drive (HDD) or a flash memory.

The GNSS receiver 51 identifies a position (absolute position) of the subject vehicle M on the basis of signals received from GNSS satellites. The position of the subject vehicle M may be identified or complemented by an inertial navigation system (INS) using an output of the vehicle sensor 40.

The navigation HMI 52 includes a display, a speaker, a touch panel, an input key, and the like. Part or the whole of the navigation HMI 52 and the HMI 30 described above may be configured to be shared.

The route determiner 53, for example, determines a route from a location of the subject vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determiner 53 is provided for the MPU 60.

In addition, the navigation device 50 may perform route guidance using the navigation HMI 52 on the basis of the route determined by the route determiner 53. Furthermore, the navigation device 50, for example, may be realized by a function of a terminal device such as a smartphone or a tablet terminal carried by a user. In addition, the navigation device 50 may transmit the current location and the destination to a navigation server through the communication device 20 and acquire a route received from the navigation server as a reply.

The MPU 60, for example, functions as a recommended lane setter 61 and maintains second map information 62 in a storage device such as an HDD or a flash memory. The recommended lane setter 61 divides a route provided from the navigation device 50 into a plurality of blocks (for example, divides the route into blocks of 100 [m] in the advancement direction of the vehicle) and sets a recommended lane in which the subject vehicle M is to run for each block by referring to the second map information 62.

For example, in a case in which a route provided from the navigation device 50 has a plurality of lanes, the recommended lane setter 61 sets one lane among a number of lanes included in each block as a recommended lane in each block. In a case in which there is a branching point, a merging point, or the like in the provided route, the recommended lane setter 61 sets a recommended lane such that the subject vehicle M can run along a reasonable running route for proceeding to the destination at that point. For example, in a case in which there is a destination on an extension line of a lane branching from a main line including a plurality of lanes, the recommended lane setter 61 sets a lane directed toward a lane of a branching destination (branching lane) among the lanes included in the main line as a recommended lane. At this time, the recommended lane is set to a lane along the branching lane (a lane connected to a branching lane) among a plurality of lanes included in the main line before a predetermined distance from the branching point. The predetermined distance, for example, is set to a distance of a degree for which a vehicle can change lanes with sufficient spare time up to the branching point (for example, about 2 [km]).

The second map information 62 is map information having an accuracy higher than that of the first map information 54. In addition, the second map information 62, for example, includes information of the center of respective lanes, information on boundaries between lanes, or the like. In addition, in the second map information 62, road information, traffic regulations information, address information (address and zip code), facilities information, telephone number information, and the like may be included. In the road information, information representing a type of road such as an expressway, a toll road, a national highway, or a prefectural road and information such as the number of lanes of a road, the width of each lane, a gradient of a road, a position of a road (three-dimensional coordinates including longitude, latitude, and a height), the degree of curvature of a lane, locations of merging and branching points of lanes, signs installed on a road, and the like are included. The second map information 62 may be updated as is necessary by accessing another device using the communication device 20.

The driving operator 80, for example, includes an acceleration pedal, a brake pedal, a shift lever, a steering wheel, and the like. A sensor detecting the amount of an operation or the presence/absence of an operation is installed in the driving operator 80, and a result of detection acquired by the sensor described above is output to one or both of the automated driving controller 100 and the running driving force output device 200, the brake device 210, or the steering device 220.

[Configuration of Automated Driving Controller]

The automated driving controller 100, for example, includes a first controller 120 and a second controller 140. Each of the first controller 120 and the second controller 140 is realized by a processor such as a central processing unit (CPU) executing a program (software). In addition, some or all constituent elements of the first controller 120 and the second controller 140 may be realized by hardware such as a large scale integration (LSI), an application specific integrated circuit (ASIC), a field-programmable gate array (FPGA), or the like or may be realized by software and hardware in cooperation.

The first controller 120, for example, includes a subject vehicle position recognizer 121, an external system recognizer 122, and an action plan generator 123. The subject vehicle position recognizer 121 and the external system recognizer 122 are one example of a "recognizer."

The subject vehicle position recognizer 121, for example, recognizes a subject lane in which the subject vehicle M is running and a relative position and a posture of the subject vehicle M with respect to the subject lane. The subject vehicle position recognizer 121, for example, recognizes the subject lane by comparing a pattern (for example, an array of solid lines and broken lines) of a road partition line that is acquired from the second map information 62 with a pattern of the road partition line in the vicinity of the subject vehicle M that is recognized from an image captured by the camera 10. In this recognition, the position of the subject vehicle M acquired from the navigation device 50 and a processing result acquired using the INS may be additionally taken into account.

In addition, the subject vehicle position recognizer 121 may recognize the subject lane on the basis of detection results acquired by the radar 12 and the finder 14. For example, in a case in which a road partition line is a rib-type mark having flat parts and convex parts, the subject vehicle position recognizer 121 recognizes the subject lane by recognizing convex parts extending in the advancement direction of the subject vehicle M by comparing distances from the subject vehicle M to flat parts with distances from the subject vehicle M to convex parts. In addition, the subject vehicle position recognizer 121, for example, recognizes the subject lane by acquiring a difference in light reflection intensities between asphalt of the road surface and road partition lines on the basis of detection results acquired by the finder 14.

Figure 3:
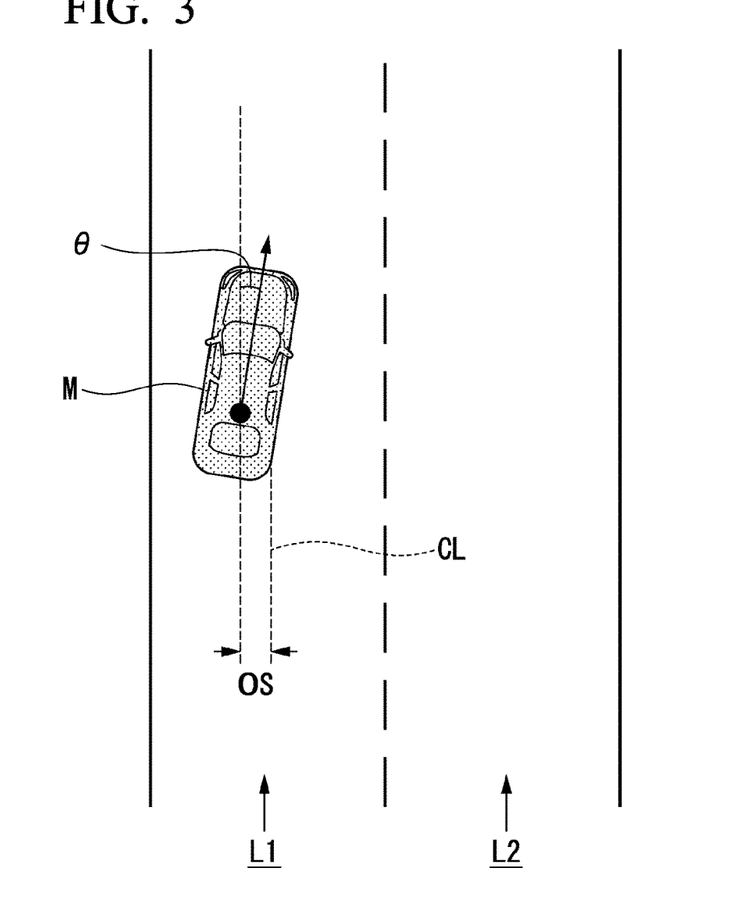
FIG. 3 is a diagram showing a view in which a relative position and a relative posture of a subject vehicle M with respect to a subject lane L1 are recognized by a subject vehicle position recognizer 121.

Then, the subject vehicle position recognizer 121, for example, recognizes a position and a posture of the subject vehicle M with respect to the recognized subject lane. FIG. 3 is a diagram showing a view in which a relative position and a posture of a subject vehicle M with respect to the subject lane L1 are recognized by the subject vehicle position recognizer 121. The subject vehicle position recognizer 121, for example, recognizes an offset OS of a reference point (for example, center of gravity) of the subject vehicle M from a running lane center CL and an angle $\theta$ in an advancement direction of the subject vehicle M formed with respect to a line acquired by aligning the running lane center CL as a relative position and a posture of the subject vehicle M with respect to the subject lane L1. In addition, instead of this, the subject vehicle position recognizer 121 may recognize a position of the reference point of the subject vehicle M with respect to one side end of the subject lane L1 or the like as a relative position of the subject vehicle M with respect to the subject lane. The relative position of the subject vehicle M recognized by the subject vehicle position recognizer 121 is provided to the external system recognizer 122 and the action plan generator 123.

In addition, instead of recognizing the subject lane by itself, the subject vehicle position recognizer 121 may recognize a position and a posture of the subject vehicle M with respect to the subject lane by referring to the subject lane recognized by the external system recognizer 122 to be described later.

The external system recognizer 122 recognizes targets by performing a sensor fusion process for detection results acquired by some or all of the external system recognizer 122, the camera 10, the radar 12, and the finder 14. The targets, for example, are a nearby vehicle, a fallen object on a vehicle road, a guard rail, an electric pole, a vehicle parked on a road, a pedestrian, a mark on a road surface, a road partition line such as a white line, a sign, and the like. The nearby vehicle, for example, is a vehicle running in the vicinity of the subject vehicle M and is a vehicle running in the same direction as the subject vehicle M. For example, a position of a target is recognized as a relative position with respect to the position of the subject vehicle M that is recognized by the subject vehicle position recognizer 121.

In addition, in a case in which a recognized target is a nearby vehicle, the external system recognizer 122 may additionally recognize a "state" of the nearby vehicle. The "state" of the nearby vehicle, for example, includes a speed, an acceleration, a jerk, an advancement direction, and the like of the nearby vehicle. In addition, the "state" of the nearby vehicle, for example, may include an "action state" of the nearby vehicle performing a lane change or about to perform a lane change. The external system recognizer 122 provides recognition results to the action plan generator 123.

The action plan generator 123, for example, includes a first trajectory generator 123a and a second trajectory generator 123b. The first trajectory generator 123a and the second trajectory generator 123b have mutually different periods for executing processes. The first trajectory generator 123a is one example of a "first processor," and the second trajectory generator 123b is one example of a "second processor."

Figure 4:
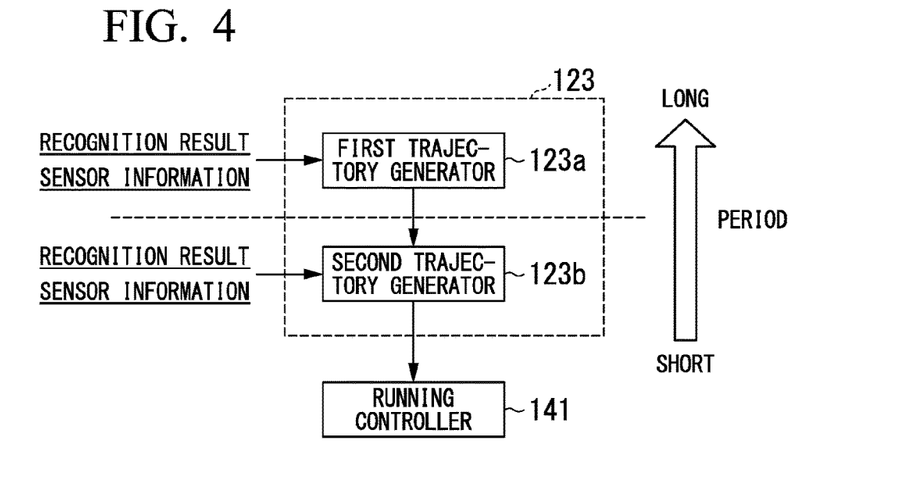
FIG. 4 is a diagram showing process periods of a first trajectory generator 123a and a second trajectory generator 123b.

FIG. 4 is a diagram showing process periods of the first trajectory generator 123a and the second trajectory generator 123b. As illustrated in the drawing, for example, the process period of the second trajectory generator 123b (hereinafter referred to as a second period Tb) is shorter than the process period of the first trajectory generator 123a (hereinafter referred to as a first period Ta).

The first trajectory generator 123a generates an action plan such that the subject vehicle M runs in a lane set by the recommended lane setter 61 as a recommended lane, and surrounding situations of the subject vehicle M can be handled. For example, the first trajectory generator 123a generates an action plan on the basis of a route in which the recommended lane is set, the position of the subject vehicle M recognized using road partition lines, the position of a target with reference to the position of the subject vehicle M, and a relative speed, a relative distance, and the like between the subject vehicle M and the target.

The action plan is configured of events that are sequentially executed under the automated driving mode. The automated driving mode represents controlling of at least one of acceleration/deceleration and steering of the subject vehicle M using the automated driving controller 100.

Among the events, for example, there are a constant-speed running event in which the subject vehicle runs at a constant speed in the same running lane, a following running event in which the subject vehicle follows a vehicle running ahead, a lane changing event in which a running lane is changed, an overtaking event in which a vehicle running ahead is overtaken, and the like.

In addition, among the events, a merging event in which the running lane is changed to a merging lane by accelerating/decelerating the subject vehicle M in the merging lane used for merging into a main line, a branching event in which the lane of the subject vehicle M is changed to a branching lane branching from a main line from a branching point, an emergency stop event in which the subject vehicle M is urgently stopped in accordance with behaviors of nearby vehicles and the like, a switching event (a take-over event) for ending an automated driving mode and switching over to a manual driving mode, and the like may be included. The manual driving mode represents a mode in which the running driving force output device 200, the brake device 210, and the steering device 220 are controlled in accordance with an operation of a vehicle occupant on the driving operator 80. In addition, there are also cases in which, during the execution of such an event, an avoiding event for avoidance is planned on the basis of the surrounding situations of the subject vehicle M (stopped vehicles, nearby vehicles, presence of pedestrians, lane narrowing due to road construction, and the like on a vehicle road).

The first trajectory generator 123a generates a first target trajectory that is a target trajectory in which the subject vehicle M will run in the future for each planned event on the basis of states of the subject vehicle such as a speed, an acceleration, an azimuth, and the like of the subject vehicle M detected by the vehicle sensor 40.

The first target trajectory is represented by sequentially aligning trajectory points. A trajectory point is a target position to be reached by the subject vehicle M in the future for every predetermined running distance. In addition, the first target trajectory includes elements of a target speed and a target acceleration of the subject vehicle M in the future for every predetermined sampling time (for example, about several tenths of a [sec]) in addition to trajectory points. A speed element and an acceleration element of the first target trajectory are one example of a "first target speed."

In addition, a trajectory point may be a target position to be reached by the subject vehicle M at a sampling time for every predetermined sampling time. In such a case, a target speed and a target acceleration may be determined in accordance with an interval of trajectory points.

Figure 5:
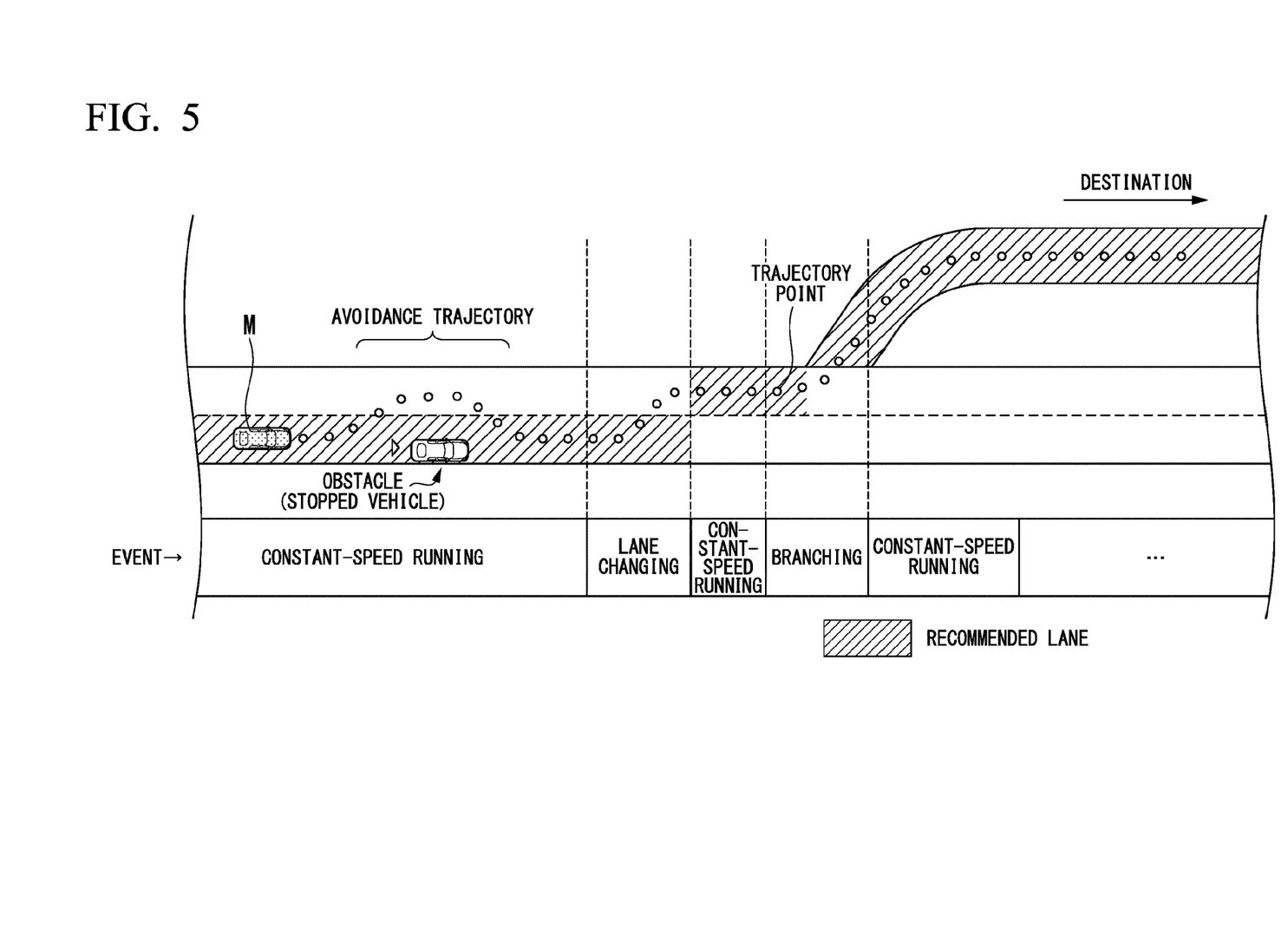
FIG. 5 is a diagram showing a view in which a first target trajectory is generated on the basis of a recommended lane.

FIG. 5 is a diagram showing a view in which a first target trajectory is generated on the basis of a recommended lane. As illustrated in the drawing, the recommended lane is set such that it is convenient for the subject vehicle to run along a route to a destination. When the subject vehicle reaches a point before a recommended lane switching point, the first trajectory generator 123a starts the lane changing event, the branching event, the merging event, or the like. For example, in a case in which the lane changing event is started, the first trajectory generator 123a generates a first target trajectory reaching an adjacent lane recognized by the external system recognizer 122 from the subject lane recognized by the subject vehicle position recognizer 121.

In addition, in a case in which an obstacle OB is recognized by the external system recognizer 122 during the execution (during the operation) of each event, the first trajectory generator 123a plans and executes an avoiding event and generates a first target trajectory for avoiding the obstacle OB by temporarily performing a lane change of the subject vehicle M to an adjacent lane once in order to avoid the obstacle OB as illustrated in the drawing. An obstacle OB is a target located forward in the advancement direction of the subject vehicle M and, for example, is a nearby vehicle, a fallen object, a pedestrian, a lane narrowing point, or the like present in the subject lane.

In addition, instead of generating a first target trajectory for avoiding an obstacle OB, the first trajectory generator 123a may generate a first target trajectory for decelerating the subject vehicle M such that it stops before the obstacle OB.

The first trajectory generator 123a, for example, generates a plurality of candidates, of which shapes (a positional relation of target positions) are different from each other, for a first target trajectory at the time of each event and selects a first target trajectory that is optimal at that time point among the plurality of candidates for the first target trajectory in view of safety and efficiency. Then, the first trajectory generator 123a provides the selected first target trajectory to the second trajectory generator 123b.

The second trajectory generator 123b generates a second target trajectory that is a target trajectory along which the subject M will run in the future on the basis of the first target trajectory provided by the first trajectory generator 123a, the target recognized by the external system recognizer 122, and the state of the subject vehicle M detected by the vehicle sensor 40.

Similar to the first target trajectory, the second target trajectory is represented by sequentially aligning trajectory points. In addition, the second target trajectory includes elements of a target speed and a target acceleration of the subject vehicle M in the future for every predetermined sampling time in addition to trajectory points. The speed element and the acceleration element of the second target trajectory are one example of a "second target speed."

For example, in a case in which an obstacle OB is recognized by the external system recognizer 122, the second trajectory generator 123b determines whether or not the first target trajectory and the obstacle OB interfere with each other and generates a second target trajectory in a case in which it is determined that the first target trajectory and the obstacle OB interfere with each other.

For example, when it is assumed that the subject vehicle M is caused to run along the first target trajectory, in consideration of the width of the subject vehicle M and the size of the obstacle OB in the lane width direction the second trajectory generator 123b determines that the first target trajectory and the obstacle OB interfere with each other in a case in which at least part of the body of the subject vehicle M interferes with an obstacle OB.

In a case in which it is determined that the first target trajectory and the obstacle OB interfere with each other, for example, the second trajectory generator 123b generates a second target trajectory in which a target speed and a target acceleration are decreased at each sampling time of the first target trajectory in accordance with the relative speed or the relative distance between the obstacle OB and the subject vehicle M while maintaining the trajectory shape of the first target trajectory (without changing the target positions). For example, the second trajectory generator 123b generates a second target trajectory in which a target speed and a target acceleration are decreased more as the relative speed becomes higher, or as the relative distance becomes shorter.

For example, by configuring the shape of the second target trajectory to be a trajectory shape in which the shape of the first target trajectory is maintained, there is no need to refer to a result of recognition of the shape of the subject lane, a result of recognition of a shape of an adjacent lane adjacent to the subject lane, a result of recognition of a state of nearby vehicles in the adjacent lane, and the like. In addition, there is no need to wait until such recognition results are provided from the subject vehicle position recognizer 121 or the external system recognizer 122 or to synchronize such recognition results. As a result, the process performed by the second trajectory generator 123b is a more simple process than the process performed by the first trajectory generator 123a. Accordingly, as described above, the second period Tb that is the process period of the second trajectory generator 123b can be configured to be shorter than the first period Ta that is the process period of the first trajectory generator 123a.

The second trajectory generator 123b provides the generated second target trajectory to the running controller 141. On the other hand, in a case in which it is determined that the first target trajectory and the obstacle OB do not interfere with each other, the second trajectory generator 123b provides the first target trajectory provided by the first trajectory generator 123a to the running controller 141.

The second controller 140 includes a running controller 141. The running controller 141 controls the running driving force output device 200, the brake device 210, and the steering device 220 such that the subject vehicle M passes through the first target trajectory or the second target trajectory provided by the action plan generator 123 at a scheduled time.

The running driving force output device 200 outputs a running driving force (torque) for allowing a vehicle to run to driving wheels. The running driving force output device 200, for example, includes a combination of an internal combustion engine, an electric motor, a transmission gear, and the like and an ECU controlling such components. The ECU controls the components described above on the basis of information input from the running controller 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running controller 141 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the running controller 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running controller 141 or information input from the driving operator 80.

Figure 6:
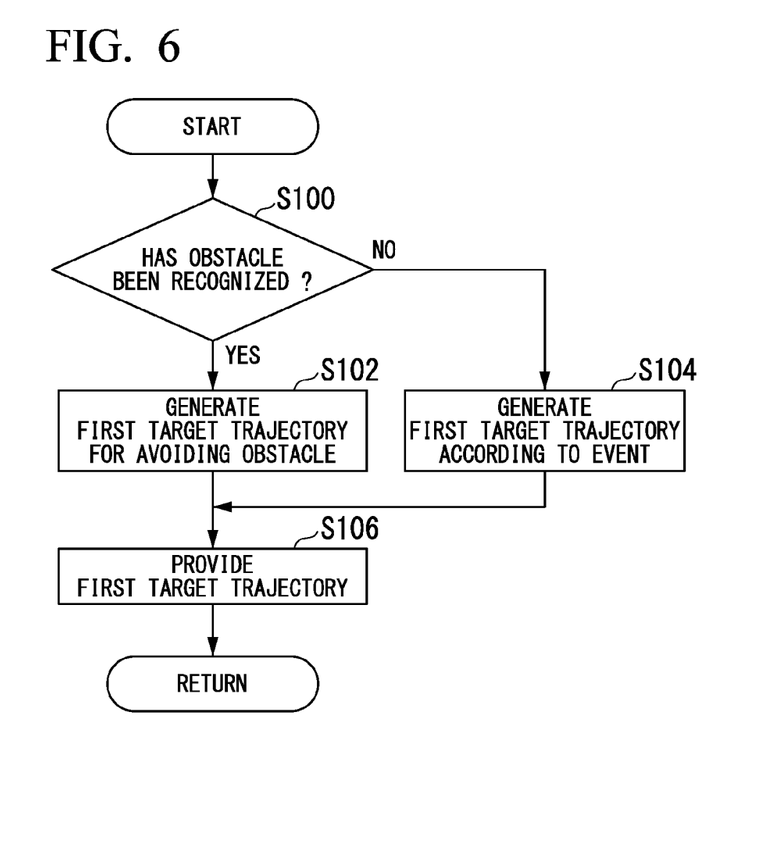

Hereinafter, a series of processes performed by the first trajectory generator 123a and the second trajectory generator 123b will be described using a flowchart. FIG. 6 is a flowchart illustrating a series of processes performed by the first trajectory generator 123a. The process of this flowchart is repeatedly performed at a first period Ta.

First, the first trajectory generator 123a determines whether or not an obstacle OB has been recognized by the external system recognizer 122 by referring to a recognition result acquired using the external system recognizer 122 (Step S100). In a case in which it is determined that an obstacle OB has been recognized by the external system recognizer 122, the first trajectory generator 123a plans and executes an avoiding event and generates a first target trajectory used for avoiding the obstacle OB (Step S102).

On the other hand, in a case in which it is determined that no obstacle OB has been recognized by the external system recognizer 122, the first trajectory generator 123a generates a first target trajectory according to an event planned in advance (Step S104). For example, in a case in which a constant-speed running event is planned, the first trajectory generator 123a generates a first target trajectory in which a target speed and a target acceleration are constant, and trajectory points are disposed in the same lane.

Next, the first trajectory generator 123a provides the generated first target trajectory to the second trajectory generator 123b (Step S106). In this way, the process of this flowchart ends.

Figure 7:
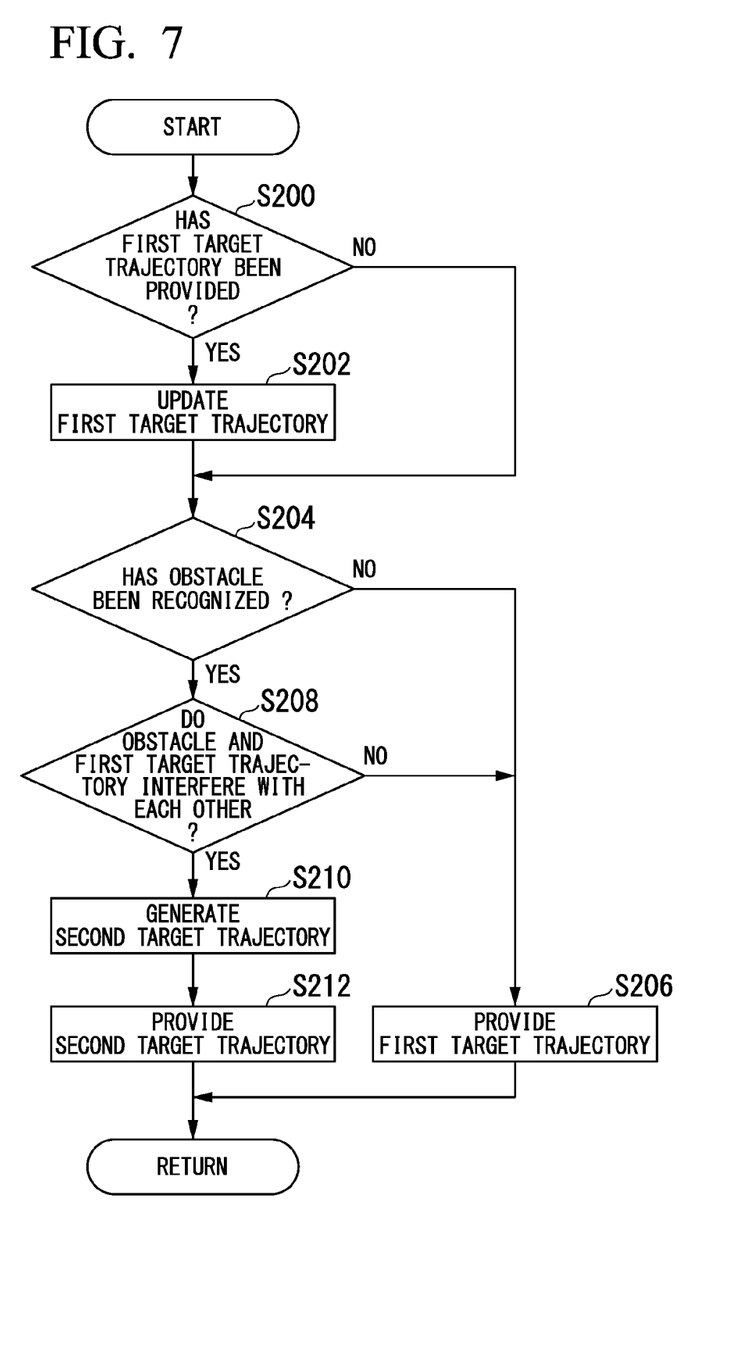
FIG. 7 is a flowchart illustrating a series of processes performed by the second trajectory generator 123b.

FIG. 7 is a flowchart illustrating a series of processes performed by the second trajectory generator 123b. The process of this flowchart is repeatedly performed at a second period Tb.

First, the second trajectory generator 123b determines whether or not a first target trajectory is provided by the first trajectory generator 123a (Step S200), and when the first target trajectory is provided by the first trajectory generator 123a, updates the first target trajectory referred to at the time of generating a second target trajectory from the first target trajectory provided in the past to the first target trajectory that has newly been provided (Step S202). The first target trajectory that is referred to at the time of generating a second target trajectory, for example, may be stored in a storage device (not illustrated in the drawing) such as a random access memory (RAM), a hard disk drive (HDD), a flash memory, or the like. In addition, in a case in which a first target trajectory has never been provided by the first trajectory generator 123a in the past, the second trajectory generator 123b may omit the process of S202.

Next, the second trajectory generator 123b determines whether or not an obstacle OB has been recognized by the external system recognizer 122 by referring to a recognition result acquired using the external system recognizer 122 (Step S204). In a case in which it is determined that no obstacle OB has been recognized by the external system recognizer 122, the second trajectory generator 123b provides a first target trajectory of which an update time is the latest among first target loci provided by the first trajectory generator 123a to the running controller 141 (Step S206).

On the other hand, in a case in which it is determined that an obstacle OB has been recognized by the external system recognizer 122, the second trajectory generator 123b determines whether or not the first target trajectory of which the update time is the latest and the obstacle OB interfere with each other (Step S208).

In a case in which it is determined that the first target trajectory and the obstacle OB do not interfere with each other, the second trajectory generator 123b causes the process to proceed to S206 described above.

On the other hand, in a case in which it is determined that the first target trajectory and the obstacle OB interfere with each other, the second trajectory generator 123b generates a second target trajectory in which a target speed and a target acceleration at each sampling time of the first target trajectory are decreased in accordance with the relative speed or the relative distance between the obstacle OB and the subject vehicle M with the shape of the first target trajectory maintained (Step S210).

Next, the second trajectory generator 123b provides the generated second target trajectory for the running controller 141 (Step S212). In this way, the process of this flowchart ends.

Figure 8:
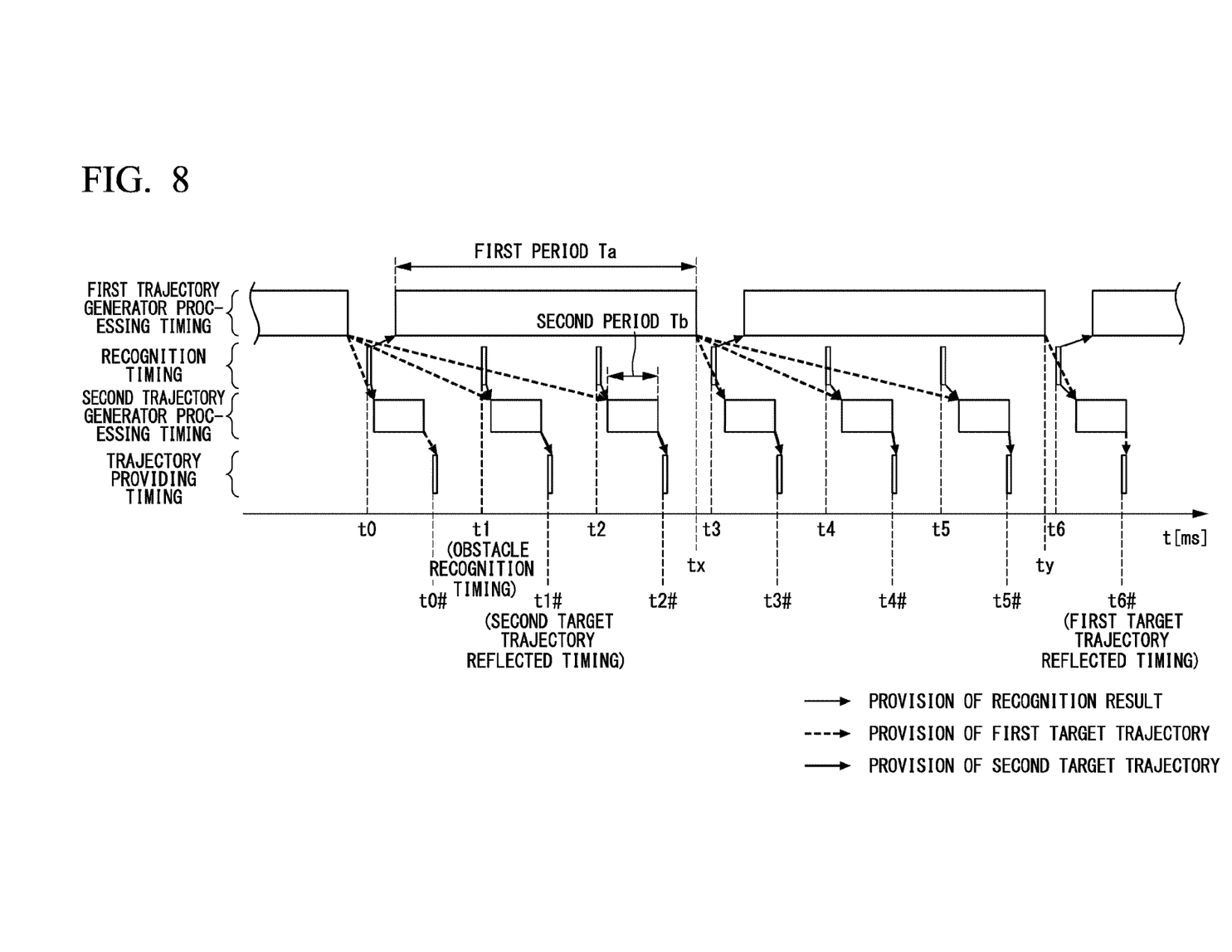
FIG. 8 is a diagram schematically illustrating timings of the processes performed by the first trajectory generator 123a and the second trajectory generator 123b.

FIG. 8 is a diagram schematically illustrating timings of the processes performed by the first trajectory generator 123a and the second trajectory generator 123b. In the drawing, the horizontal axis represents time (for example, in units of [ms]).

For example, it is assumed that an obstacle OB starts to be recognized by the external system recognizer 122 at the timing of a time t1. At this time, in a case in which the first trajectory generator 123a has started the process of the flowchart illustrated in FIG. 6 described above by referring to a recognition result acquired by the external system recognizer 122 at a time t0, next, it is necessary to wait for the elapse of a time corresponding to the first period Ta for referring to a recognition result indicating that there is an obstacle OB. As illustrated in the drawing, for example, in a case in which the process of generating a first target trajectory ends at a time tx ($\approx$t0+Ta), the first trajectory generator 123a can start the process of generating a first target trajectory in which the presence of the obstacle OB is reflected at a time point (a time t3) at which a recognition result acquired by the external system recognizer 122 is provided next. The first target trajectory in which the presence of the obstacle OB is reflected, for example, as described above, is a trajectory for avoiding the obstacle OB by causing the subject vehicle M to perform a lane change to an adjacent lane.

For example, in a case in which the process of generating a first target trajectory using a recognition result of the time t3 is ended by the first trajectory generator 123a at a time ty ($\approx$t3+Ta), the second trajectory generator 123b starts the process of the flowchart illustrated in FIG. 7 described above at a time point at which both the first target trajectory provided by the first trajectory generator 123*a* and the recognition result provided by the external system recognizer 122 are received and provides the first target trajectory or the second target trajectory to the running controller 141 in accordance with presence/absence of interference between the first target trajectory and the obstacle OB. Here, since the first target trajectory is generated such that the subject vehicle M avoids the obstacle OB (the subject vehicle M does not interfere with the obstacle OB), the first target trajectory is provided at a time t6 # (≈t6+Tb) at which the second period Tb that is a process period of the second trajectory generator 123*b* elapses.

In the example illustrated in the drawing, since the recognition result of the time t0 is provided from the external system recognizer 122 during the process period of the second trajectory generator 123*b*, the second trajectory generator 123*b* starts the process at a time point at which the recognition result is provided. At this time point, since the first target trajectory generated before the obstacle OB is recognized (before the time t1) is provided by the first trajectory generator 123*a*, there are cases in which the first target trajectory and the obstacle OB interfere with each other.

For example, in a case in which the second trajectory generator 123*b* does not perform the process of generating a second target trajectory after performing determination of interference between the first target trajectory and the obstacle OB, the first target trajectory generated before a period until the first target trajectory for avoidance is generated by the first trajectory generator 123*a*, in other words, the time t1, is provided to the running controller 141. As a result, until a time of a maximum of about 2 Ta elapses, there are cases in which the subject vehicle M cannot avoid the obstacle OB.

In contrast to this, in this embodiment, the second trajectory generator 123*b* performs determination of interference between the first target trajectory and the obstacle OB at the second period Tb that is shorter than the first period Ta, and in a case in which they interfere with each other, provides a second target trajectory for the running controller 141 at a time t1 # (≈t1+tb) when one period Tb elapses. Accordingly, the running controller 141 can control acceleration/deceleration of the subject vehicle M at an earlier timing. As a result, the subject vehicle M can avoid the obstacle OB more quickly.

In addition, the second trajectory generator 123*b* continuously generates a second target trajectory while changing the target speed and the target acceleration that are speed elements of the second target trajectory in accordance with the relative distance and the relative speed with respect to the obstacle OB that is continuously recognized moment by moment by the external system recognizer 122 until a first target trajectory in consideration of the obstacle OB is generated. For example, in a case in which an obstacle OB is stopped, a relative distance between the obstacle OB and the subject vehicle M approaching it becomes shorter as time elapses, and accordingly, the second trajectory generator 123*b* generates a second target trajectory while further decreasing the target speed and the target acceleration every time the process period (the number of times processing is performed) is repeated. In this way, the speed and the acceleration of the subject vehicle M are decreased in a stepped manner, and accordingly, the load on a vehicle occupant can be reduced.

Figure 9:
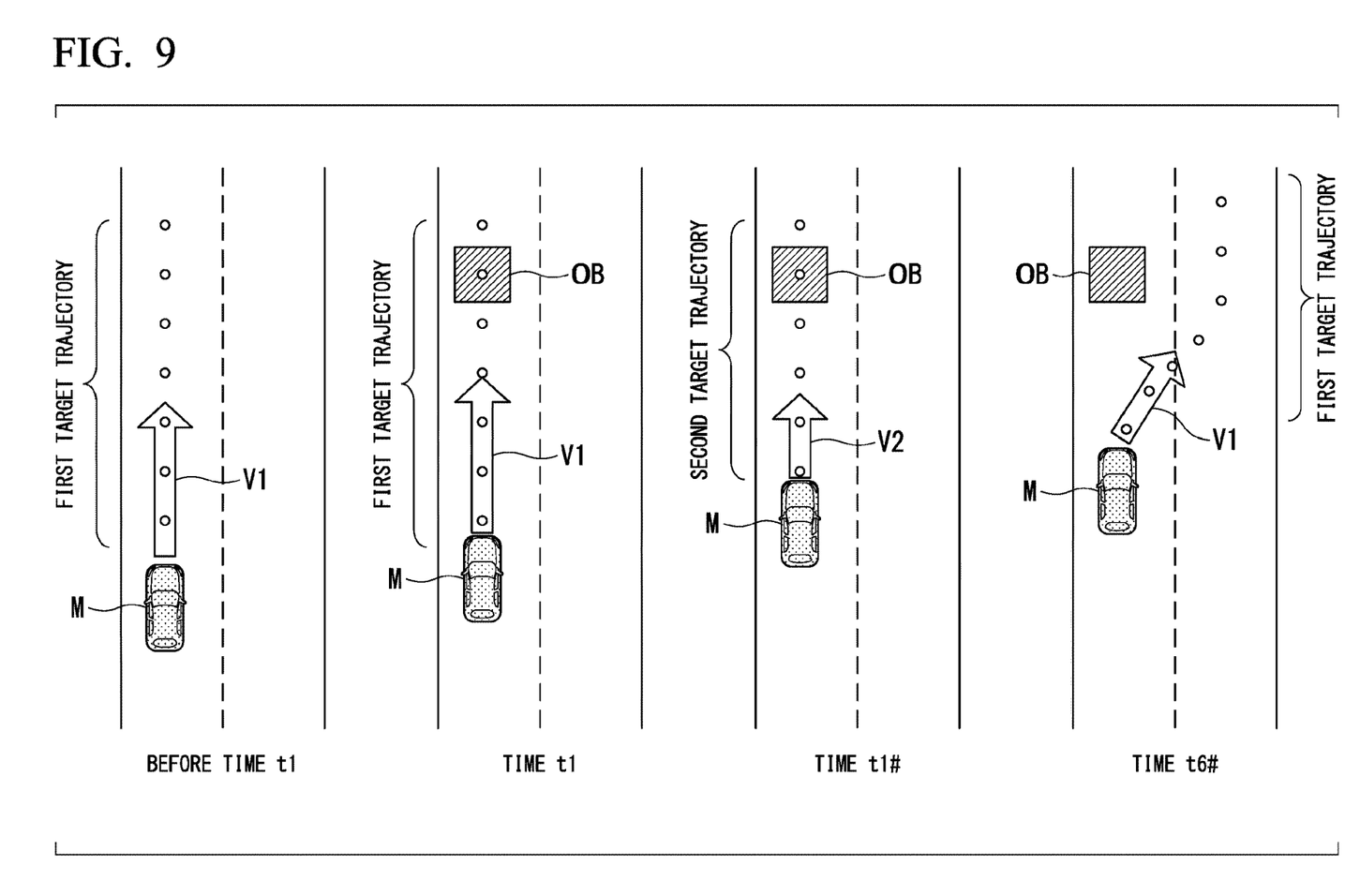
FIG. 9 is a diagram schematically illustrating a behavior of a subject vehicle M to which a control method according to this embodiment is applied.

FIG. 9 is a diagram schematically illustrating a behavior of a subject vehicle M to which a control method according to this embodiment is applied. A behavior of the subject vehicle M at each time illustrated in the drawing reflects process results acquired by the first trajectory generator 123*a* and the second trajectory generator 123*b* at each time illustrated in FIG. 8.

For example, in a case in which a constant-speed running event is planned before the time t1 at which an obstacle OB has not yet been recognized, as illustrated in the drawing, the first trajectory generator 123*a* generates a first target trajectory in which the target speed is constant, and trajectory points are disposed on the same lane. In the drawing, an arrow V1 represents a speed element and an acceleration element of the first target trajectory, and a length of the arrow represents a magnitude of the target speed.

In a case in which an obstacle OB is recognized at the time t1, the external system recognizer 122 provides a result of the recognition for the first trajectory generator 123*a* and the second trajectory generator 123*b*. As described above, the first trajectory generator 123*a* starts the process of generating a first target trajectory by referring to a recognition result before the time t1 and thus cannot reflect the recognition result of the time t1. On the other hand, the second trajectory generator 123*b* ends a series of processes referring to a recognition result before the time t1 (a recognition result at the time t0) and thus acquires the recognition result of the time t1 and starts the process. In addition, the external system recognizer 122 may not provide a recognition result for a generator that is in the middle of execution of the process by monitoring start timings and end timings of the processes performed by the first trajectory generator 123*a* and the second trajectory generator 123*b*.

The second trajectory generator 123*b* generates a second target trajectory by referring to the recognition result of the time t1 at a time t1 #. In the drawing, an arrow V2 represents a target speed of the second target trajectory, and a length of the arrow represents a magnitude of the target speed. As can be known by comparing the lengths of the arrows V1 and V2, the target speed of the second target trajectory is lower than the target speed of the first target trajectory. In this way, before a first target trajectory in consideration of the obstacle OB is generated, the running controller 141 starts deceleration of the subject vehicle M on the basis of the second target trajectory in consideration of the obstacle OB.

A first target trajectory provided by the first trajectory generator 123*a* at a time t6 #, for example, as illustrated in the drawing, is a trajectory in which the lane of the subject vehicle M is changed to an adjacent lane. At this time, when the subject vehicle M is decelerated along the second target trajectory, the first trajectory generator 123*a* generates a first target trajectory using detection results such as a speed, an acceleration, and the like detected by the vehicle sensor 40, and accordingly, a second target trajectory having a speed element of the same degree as that of the nearest second target trajectory is generated. In this way, when steering and acceleration/deceleration of the subject vehicle M are controlled on the basis of the first target trajectory in consideration of the obstacle OB, the running controller 141 can cause the subject vehicle M to run smoothly without sudden acceleration or the like.

According to the embodiment described above, by including the subject vehicle position recognizer 121 and the external system recognizer 122 recognizing targets in the vicinity of the subject vehicle M, the first trajectory generator 123*a* performing the process of generating a first target trajectory including elements of a target speed, a target acceleration, and a target position of the subject vehicle M in the future at the first period Ta on the basis of targets recognized by the subject vehicle position recognizer 121 and the external system recognizer 122 and the state of the subject vehicle M detected by the vehicle sensor 40, the second trajectory generator 123b performing the process of generating a second target trajectory including elements of a target speed, a target acceleration, and a target position of the subject vehicle M in the future at the second period Tb that is shorter than the first period Ta on the basis of the first target trajectory generated by the first trajectory generator 123a, targets recognized by the subject vehicle position recognizer 121 and the external system recognizer 122 and the state of the subject vehicle M detected by the vehicle sensor 40, and the running controller 141 controlling acceleration/deceleration and steering of the subject vehicle M on the basis of at least one of the first target trajectory generated by the first trajectory generator 123a and the second target trajectory generated by the second trajectory generator 123b, an avoiding action for a target such as an obstacle OB can be performed more quickly.

Hereinafter, modified examples of the embodiment described above will be described. For example, as illustrated in FIG. 1, in a case in which a plurality of sensors (the camera 10, the radar 12, and the finder 14) are disposed in the vicinity of the subject vehicle M, the external system recognizer 122 may provide a recognition result recognized using detection results acquired by all the sensors disposed in the vicinity of the subject vehicle M for the first trajectory generator 123a and provide a recognition result recognized using detection results of sensors (for example, the camera 10, the radar 12-1, and the finder 14-1) disposed on a side in front of the subject vehicle M among a plurality of sensors disposed in the vicinity of the subject vehicle M for the second trajectory generator 123b.

For example, the first trajectory generator 123a preferably uses detection results acquired by all the sensors disposed in the vicinity of the subject vehicle M for planning various events as an action plan or generating a first target trajectory in accordance with each event on the basis of a route in which a recommended lane is set, the position of the subject vehicle M recognized using road partition lines, the position of a target with reference to the position of the subject vehicle M, the relative speed and the relative distance between the subject vehicle M and the target, and the like.

On the other hand, the second trajectory generator 123b may acquire at least only a recognition result of an obstacle OB when performing determination of interference between the first target trajectory and the obstacle OB and accordingly may omit the use of detection results of sensors (for example, the radars 12-2 to 12-6 and the finders 14-2 to 14-7) detecting the lateral side and the rear side of the subject vehicle M.

As a result, the second trajectory generator 123b can generate a second target trajectory using less information (in this case, detection results acquired by sensors disposed on the side in front and the first target trajectory) than the information used at the time of generating a first target trajectory.

In addition, a detection result acquired by a sensor used when the surrounding environment of the subject vehicle M is recognized may be selected on the basis of a detection period of the sensor.

Figure 10:
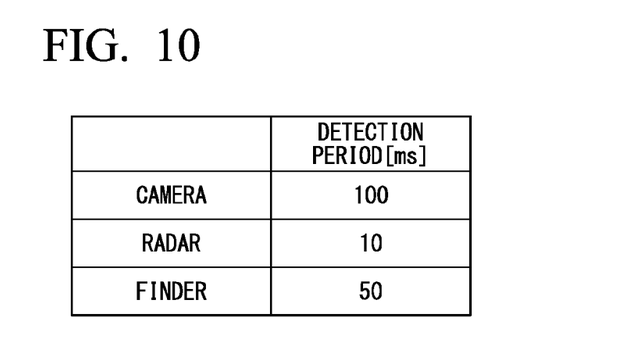
FIG. 10 is a diagram showing one example of detection periods of sensors.

FIG. 10 is a diagram showing one example of detection periods of sensors. In a detection period in the drawing, for example, an execution time of a predetermined process performed by each sensor may be included. The predetermined process, for example, is a process of generating a captured image or image processing for correcting the contrast and the like of a generated captured image in a case in which the sensor is the camera 10 and is various signal processing including modulation/demodulation in a case in which the sensor is the radar 12 or the finder 14.

For example, as illustrated in the drawing, in a case in which the detection period of the radar 12 is shorter than that of any other sensor, the external system recognizer 122 may provide only recognition results acquired by using detection results acquired by the radars 12-1 to 12-6 for the second trajectory generator 123b. In addition, the external system recognizer 122 may provide a recognition result recognized using a detection result acquired by a sensor of which the detection period is shorter than that of any other sensor among a plurality of sensors disposed on a side in front of the subject vehicle M (for example, the camera 10, the radar 12-1, and the finder 14-1) for the second trajectory generator 123b. In this way, in a sensor fusion process, the synchronization of detection results acquired by sensors is quickly achieved, and accordingly, a second target trajectory is generated at an earlier timing. As a result, the subject vehicle M can perform an avoiding action for the obstacle OB more quickly.

As above, although a form of the present invention has been described using an embodiment, the present invention is not limited to such an embodiment at all, and various modifications and substitutions can be applied within a range not departing from the concept of the present invention.

DESCRIPTION OF REFERENCE NUMERALS

1 vehicle control system
10 camera
12 radar
14 finder
20 communication device
30 HMI
40 vehicle sensor
50 navigation device
51 GNSS receiver
52 navigation HMI
53 route determiner
54 first map information
60 MPU
61 recommended lane setter
62 second map information
80 driving operator
100 automated driving controller
120 first controller
121 subject vehicle position recognizer
122 external system recognizer
123 action plan generator
123a first trajectory generator
123b second trajectory generator
140 second controller
141 running controller
200 running driving force output device
210 brake device
220 steering device

What is claimed is:
1. A vehicle control system comprising:
 a third processor configured to recognize a target in the vicinity of a subject vehicle using a plurality of sensors of the subject vehicle;
 a first processor configured to repeatedly perform a process of determining a first target speed, which is a target speed of the subject vehicle in the future and a target position of the subject vehicle in the future, at a first period on the basis of the target recognized by the third processor and a state of the subject vehicle;

a second processor configured to repeatedly perform a process of determining a second target speed, which is a target speed of the subject vehicle in the future, at a second period shorter than the first period on the basis of the target recognized by the third processor and the state of the subject vehicle; and a running controller configured to control acceleration/deceleration of the subject vehicle on the basis of at least one of the first target speed determined by the first processor and the second target speed determined by the second processor, and control steering of the subject vehicle on the basis of the target position determined by the first processor, wherein the second processor is further configured to determine the second target speed in accordance with a relative position of the target position determined by the first processor and a position of the target recognized by the third processor.

2. The vehicle control system according to claim 1, wherein the second processor determines whether or not the subject vehicle and the target interfere with each other in the process of reaching the target position and sets the second target speed to a speed lower than the first target speed in a case in which it is determined that the subject vehicle and the target interfere with each other.

3. The vehicle control system according to claim 2, wherein the second processor determines the second target speed on the basis of a relative distance or a relative speed between the subject vehicle and the target.

4. The vehicle control system according to claim 1, wherein the third processor recognizes the target using detection results acquired by the plurality of sensors, and wherein the second processor determines the second target speed on the basis of the target recognized by the third processor using a detection result acquired by a sensor disposed on the front of the subject vehicle among the plurality of sensors and the first target speed.

5. The vehicle control system according to claim 4, wherein the plurality of sensors have mutually different detection periods, and wherein the second processor determines the second target speed on the basis of the target recognized by the third processor using a detection result acquired by a sensor having a shorter detection period than any other sensor among the plurality of sensors.

6. A vehicle control method using an in-vehicle computer, the vehicle control method comprising:

recognizing a target in the vicinity of a subject vehicle;

repeatedly performing a process of determining a first target speed, which is a target speed of the subject vehicle in the future and a target position of the subject vehicle in the future, at a first period on the basis of the recognized target and a state of the subject vehicle;

repeatedly performing a process of determining a second target speed, which is a target speed of the subject vehicle in the future, at a second period shorter than the first period on the basis of the recognized target and the state of the subject vehicle;

controlling acceleration/deceleration of the subject vehicle on the basis of at least one of the determined first target speed and the determined second target speed;

controlling steering of the subject vehicle on the basis of the determined target position; and determining the second target speed in accordance with a relative position of the determined target position and a position of the recognized target.

7. A computer-readable non-transitory storage medium storing a vehicle control program causing an in-vehicle computer to execute:

recognizing a target in the vicinity of a subject vehicle;

repeatedly performing a process of determining a first target speed, which is a target speed of the subject vehicle in the future and a target position of the subject vehicle in the future, at a first period on the basis of the recognized target and a state of the subject vehicle;

repeatedly performing a process of determining a second target speed, which is a target speed of the subject vehicle in the future, at a second period shorter than the first period on the basis of the recognized target and the state of the subject vehicle;

controlling acceleration/deceleration of the subject vehicle on the basis of at least one of the determined first target speed and the determined second target speed;

controlling steering of the subject vehicle on the basis of the determined target position; and determining the second target speed in accordance with a relative position of the determined target position and a position of the recognized target.

* * * * *